S. HOUGH.
ADJUSTABLE CUTTING HEAD FOR LATHES.
APPLICATION FILED SEPT. 11, 1917.
1,301,699. Patented Apr. 22, 1919.
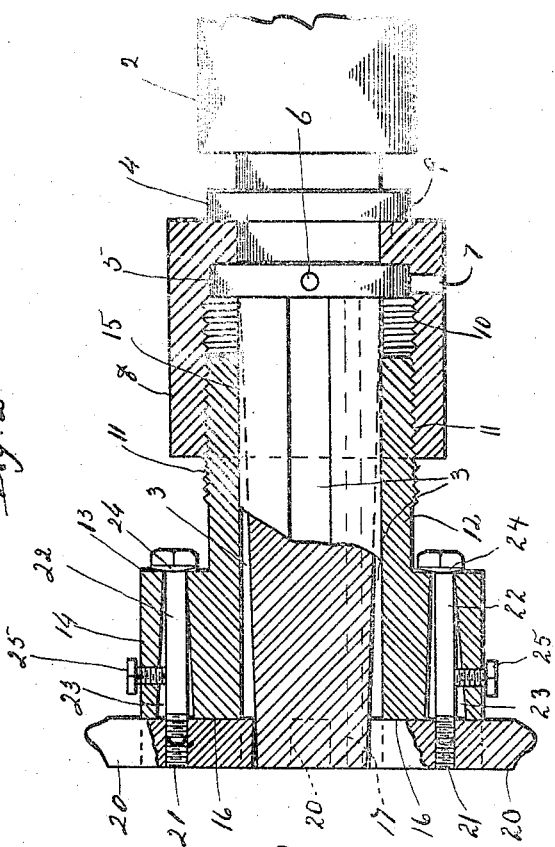
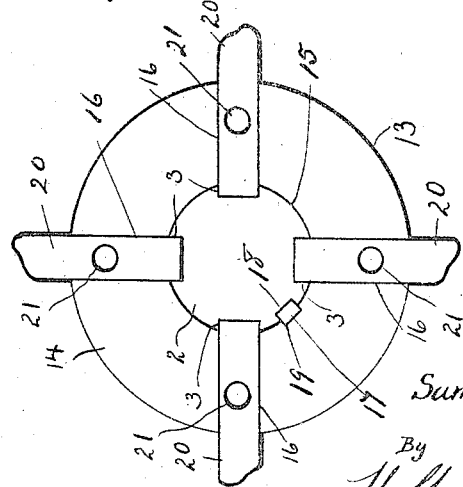
INVENTOR
Samuel Hough
By W. W. Williamson
Atty.

UNITED STATES PATENT OFFICE.

SAMUEL HOUGH, OF ATCO, NEW JERSEY.

ADJUSTABLE CUTTING-HEAD FOR LATHES.

1,301,699.

Specification of Letters Patent.   Patented Apr. 22, 1919.

Application filed September 11, 1917.   Serial No. 190,708.

*To all whom it may concern:*

Be it known that I, SAMUEL HOUGH, a citizen of the United States, residing at Atco, in the county of Camden and State of New Jersey, have invented new and useful Improvements in Adjustable Cutting-Heads for Lathes, of which the following is a specification.

My invention relates to new and useful improvements in adjustable cutting heads for lathes, and has for its object to provide a device of this character which is especially adapted for boring out shells using either roughing or finishing tools of any desirable and suitable construction.

Another object of the invention is to provide a device of the character stated adapted to carry a plurality of cutting tools, all of which may be simultaneously adjusted and made fast in their adjusted positions to prevent accidental displacement.

A further object of the invention is to provide a new and effective means movable with the cutting tools for holding said tools in their proper positions relative to the adjustable sleeve.

A still further object of the invention is to provide in combination with a spindle or shaft having inclined grooves therein, an adjustable sleeve slidably mounted on said spindle having radial slots in its outer face in which the cutting tools are mounted, the inner ends of said cutting tools registering with the inclined grooves and being held in place by bolts arranged to swing with the inward and outward movement of the tools, said bolts being held against movement in one direction by means of lock bolts and a nut swiveled to the spindle and having threaded engagement with the sleeve for moving the same along the spindle to adjust the tools inward or outward.

Another object of the invention is to provide a cutting head wherein a plurality of tools may be utilized so that the work may be done more quickly and more accurately for because of the different points of bearing of the tools upon the work, said tools will be prevented from chattering, making it unnecessary to caliper each and every piece or different parts of any one piece of work.

A further object of the invention is to provide a tool head so constructed that the tools used therewith may be readily and quickly adjusted to different sizes or to the original size as the cutting edge wears away, thus making it necessary only to caliper the tool, and as this is outside work, it is a relatively easy matter, and since the tools are usually ground or sharpened in a "gang" it will only be necessary to measure the distance from the center of the spindle to the outermost cutting edge of one of the tools, at which time, all tools will then be the same distance from the center.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which—

Figure 1, is a front or end elevation of my improved adjustable cutting head for lathes showing a set of tools mounted therein, and Fig. 2, is a longitudinal sectional view thereof, parts being left in elevation to clearly illustrate the construction.

In carrying out my invention as here embodied, 2 represents a lathe spindle or tool head carrying shaft having longitudinal grooves 3 formed therein running from the outer end inward any desirable distance and having their bottom walls tapered and diverging or running outward from their outer ends toward their inner ends as plainly shown in Fig. 2. There are preferably four of these grooves 3, although a different number may be used and these grooves are preferably equi-distant from each other or evenly distributed around the circumference of the outer end of the spindle. Some distance beyond the inner ends of the grooves 3, the spindle carries a collar 4 which is preferably formed integral with the spindle and will be termed the stationary collar, and some distance from said collar is located the removable collar 5 held in position by some suitable retaining means, such as a pin 6 which may be inserted through an opening 7 in the adjusting nut 8, said adjusting nut being provided with an inturned flange 9 adapted to register with the space between the stationary collar 4, and the removable collar 5 so as to swivel the adjusting nut upon the spindle. The adjusting nut is provided with internal threads 10 which are adapted to coöperate with the external threads 11 on the shank 12 of the sliding sleeve 13 which also has a body portion 14 formed integral with the shank 12, said body portion being of greater diameter than the shank.

The sliding sleeve 13 is provided with a central longitudinal bore 15 for registration with the outer end of the spindle and in the front face of the body 14 of said sliding sleeve are formed a plurality of radial slots 16 adapted to aline with the inclined grooves 3, and this sliding sleeve is held against rotation upon the spindle in some suitable manner as by a key 17 registering with the keyways 18 and 19, the former being in the spindle and the latter in the sliding sleeve. The cutting tools 20 are adapted to set in the slots 16 with their inner ends projecting beyond the inner diameter of the body 14 formed by the central bore, and register with the inclined grooves 3.

Each of the cutting tools 20 is provided with a threaded opening 21 into which is threaded a bolt 22 from the rear face of the body 14, said bolt passing through a tapered hole 23. One of these holes 23 communicates with each of the slots 16 and said holes are tapered so that their walls diverge from their rear ends toward their forward ends or they may be elongated or oval shaped in cross section at their outer ends, with their walls converging toward their rear ends until they form a circular opening so as to permit of an inward and outward movement, relative to the spindle, of the outer or threaded ends of the bolts 22, the inner faces of the heads of which are convex as indicated by the reference numeral 24.

In order to prevent any outward movement of the cutting tools after the proper adjustment has been obtained, I provide set screws 25 which are threaded through the body 14 into each of the holes 23 so that the ends of said set screws 25 will engage the bolts 22 and firmly hold the latter against accidental movement, said set screws also acting as bolt locks to prevent rotation of said bolts 22.

In practice, when the cutting tools 20 are to be adjusted, the set screws 25 are backed off, so that the bolts 22 may move in the direction necessary during the adjusting operation. The adjusting nut 8 is then rotated in the desired direction to move the sliding sleeve 13 along the spindle causing the inner ends of the cutting tools 20 to ride along the inclined walls of the tapered grooves 3 which will move the cutting tools in or out as will be obvious according to the direction in which the sliding sleeve is moved, and as the bolts 22 are located in holes larger at their outer ends than at their inner ends, said bolts can move with the cutting tools during their adjustment. After the parts have been properly adjusted, the set screws 25 are then screwed inward until they firmly engage the bolts 22 which will prevent any outward movement of the cutting tools which would tend to get them out of adjustment.

From the foregoing description, it will be noted that I have produced an adjustable cutting head which will carry a plurality of tools for boring and finishing so that the work being done will be accomplished more speedily, every piece will be practically accurate and the same size throughout its entire length, and there will be no rough places or ridges in the finished product since the tools will be prevented from chattering because of the plurality of bearing points of the tools upon the work. It will be unnecessary to caliper each and every piece or different parts of any one piece of work as all work done with the same cutting head carrying the cutting tools will be identical, and as the tools may be readily and quickly adjusted to the different sizes or to the original size as the cutting edge wears away it will be necessary only to caliper the tool which is an easy matter because it is outside work.

Of course, I do not wish to be limited to the exact details of construction as herein shown as these may be varied within the limits of the appended claims without departing from the spirit of my invention.

Having thus fully described my invention what I claim as new and patentable is—

1. An adjustable cutting head comprising a supporting member having longitudinal inclined grooves therein, a tool holding member on said supporting member adapted to carry tools, the inner ends of which ride in the inclined grooves, a nut having threaded engagement with the tool holding member and provided with an inturned flange and a pair of spaced collars carried by the supporting member, one located on the outside and the other on the inside of the flange of said nut whereby the latter will be swiveled to the supporting member.

2. In a device of the character stated, a tool supporting member having holes therethrough of greater size at one end than the other and parallel with the axis of the tool supporting member, tools seated in the face of the tool supporting member and adjustable radially and means passing through the holes in the tool supporting member for attaching the tools to said member.

3. In a device of the character stated, a tool supporting member having holes therethrough of greater size at one end than the other and parallel with the axis of the tool supporting member, tools seated in the face of the tool supporting member and adjustable radially, bolts passing through said holes and having threaded engagement with the tools for holding said tools in place and set screws threaded through the tool supporting member into the holes for engaging the bolts to limit their outward movement.

4. A cutting head comprising a tool holding member having a body and shank, the latter being of less diameter than the former, said body having radial tool receiving slots in its outer face and provided with holes passing through the body, one of which is in alinement with each slot, said holes being of greater size at the ends where they communicate with the slots than at the other ends, tools slidably mounted within said slots, means passing through the holes and attached to the tools for holding the latter in the slots and means engaging the inner ends of said tools for adjusting the same.

5. An adjustable cutting head for lathes comprising in combination with a spindle having a plurality of grooves in its outer end, the inner walls of said groove being inclined from the outer end of the spindle outwardly to a point intermediate the length of said spindle, a sleeve or tool holding member consisting of a body and shank having a central bore therethrough for registration with the spindle, the body being of greater diameter than the shank and provided with a plurality of radial slots in its outer face, said slots alining with the grooves in the spindle, means for preventing rotation of the sleeve upon the spindle while permitting longitudinal movement thereof, tools located in the slots with their inner ends in registration with the inclined grooves, means for holding the tools in their slots and means for sliding the sleeve along the spindle to change the relation of the inner ends of the tools to the inclined surface of the slots for adjusting said tools.

6. An adjustable cutting head for lathes comprising in combination with a spindle having a plurality of screws in its outer end, the inner walls of said grooves being inclined from the outer end of the spindle outwardly to a point intermediate the length of said spindle, a sleeve or tool holding member consisting of a body and shank having a central bore therethrough for registration with the spindle, the body being of greater diameter than the shank and provided with a plurality of radial slots in its outer face, said slots alining with the grooves in the spindle, said body also having holes therethrough communicating with the radial slots, said holes being of greater size at their outer ends than at their inner ends, tools located in the radial slots, said tools having threaded openings therein, bolts passing through the holes in body and threaded into the holes in the tools, the heads of said bolts having convex inner faces to permit of a swinging movement of said bolts during the adjustment of the tools inward or outward, means for holding said bolts against outward movement after the tools have been adjusted and means for sliding the sleeve or tool holding member along the spindle for changing the relation of the inner ends of the tools to the inclined surface of the grooves, whereby said tools may be adjusted.

7. An adjustable cutting head for lathes comprising in combination with a spindle having a plurality of grooves in its outer end, the inner walls of said grooves being inclined from the outer end of the spindle outwardly to a point intermediate the length of said spindle, a sleeve or tool holding member consisting of a body and shank having a central bore therethrough for registration with the spindle, the body being of greater diameter than the shank and provided with a plurality of radial slots in its outer face, said slots alining with the grooves in the spindle, said body also having holes therethrough communicating with the radial slots, said holes being of greater size at their outer ends than at their inner ends, tools located in the radial slots, said tools having threaded openings therein, bolts passing through the holes in body and threaded into the holes in the tools, the heads of said bolts having convex inner faces to permit of a swinging movement of said bolts during the adjustment of the tools inward or outward, a stationary collar carried by the spindle to the rear of the inclined slots, a removable collar carried by the spindle and spaced from the stationary collar and a nut having threaded engagement with the shank of the sleeve and provided with an inturned flange adapted to register with the space between the two collars, said nut when rotated, moves the sleeve along the spindle and changes the position of the tools with relation to the inclined surfaces of the grooves for adjusting the tools.

In testimony whereof I have hereunto affixed my signature.

SAMUEL HOUGH.

Copies of this patent may be obtained for five cents each, by addressing the "Commissioner of Patents, Washington, D. C."